(12) United States Patent  
Brokaw et al.

(10) Patent No.: US 7,645,985 B1
(45) Date of Patent: Jan. 12, 2010

(54) METHOD AND APPARATUS FOR MAGNETIC SEPARATION OF IONS

(75) Inventors: Charles E. Brokaw, Reno, NV (US); Thomas E. Brokaw, Reno, NV (US); Crystal D. Brokaw, Reno, NV (US)

(73) Assignee: 6X7 Visioneering, Inc., Reno, NV (US)

( * ) Notice: Subject to any disclaimer, the term of this patent is extended or adjusted under 35 U.S.C. 154(b) by 197 days.

(21) Appl. No.: 11/843,446

(22) Filed: Aug. 22, 2007

(51) Int. Cl.
H01J 49/30 (2006.01)

(52) U.S. Cl. .................. 250/281; 250/282; 250/283; 250/284; 250/298; 250/396 ML; 210/222; 210/223; 204/664; 209/223.1; 209/227

(58) Field of Classification Search .......... 250/281, 250/282, 283, 284, 298, 396 ML; 210/222, 210/223; 204/664; 209/223.1, 227
See application file for complete search history.

(56) References Cited

U.S. PATENT DOCUMENTS

| 549,765 | A | 11/1895 | Calver |
| 1,553,737 | A | 9/1925 | Allingham |
| 2,533,966 | A | 12/1950 | Simmons, Jr. |
| 3,579,027 | A | 5/1971 | Pater |
| 4,019,868 | A | 4/1977 | Sebacher et al. |
| 4,067,702 | A | 1/1978 | Hickman |
| 4,233,127 | A | 11/1980 | Monahan |
| 4,342,738 | A | 8/1982 | Burgund |
| 4,405,594 | A | 9/1983 | Pyle |
| 4,419,329 | A | 12/1983 | Heller |
| 4,476,105 | A | 10/1984 | Greenbaum |
| 5,658,448 | A | 8/1997 | Lasich |
| 5,667,647 | A | 9/1997 | Suga et al. |
| 5,891,332 | A * | 4/1999 | Okamoto ............... 210/223 |
| 6,051,125 | A | 4/2000 | Pham et al. |
| 6,585,891 | B1 * | 7/2003 | Ohkawa ................. 210/222 |
| 6,768,109 | B1 * | 7/2004 | Brokaw et al. ........... 250/298 |
| 6,783,687 | B2 * | 8/2004 | Richard ................. 210/695 |
| 7,223,335 | B2 * | 5/2007 | Dunlap .................. 210/222 |
| 7,504,031 | B2 * | 3/2009 | Dunlap .................. 210/222 |
| 2004/0031759 | A1 * | 2/2004 | Richard ................. 210/695 |
| 2007/0039862 | A1 * | 2/2007 | Dunlap .................. 210/222 |

* cited by examiner

Primary Examiner—David A Vanore
Assistant Examiner—Michael Maskell
(74) Attorney, Agent, or Firm—Lewis and Roca LLP

(57) ABSTRACT

The disclosed device is directed toward an apparatus for the separation of ions. The apparatus for the separation of ions comprises a vessel including an inlet fluidly coupled to an outlet. A magnetic field is applied substantially orthogonal to the flow of the fluid. The magnetic field applies a force that separates the oppositely charged ions.

12 Claims, 3 Drawing Sheets

METHOD AND APPARATUS FOR MAGNETIC SEPARATION OF IONS

BACKGROUND

1. Field of the Invention

Figure 1:
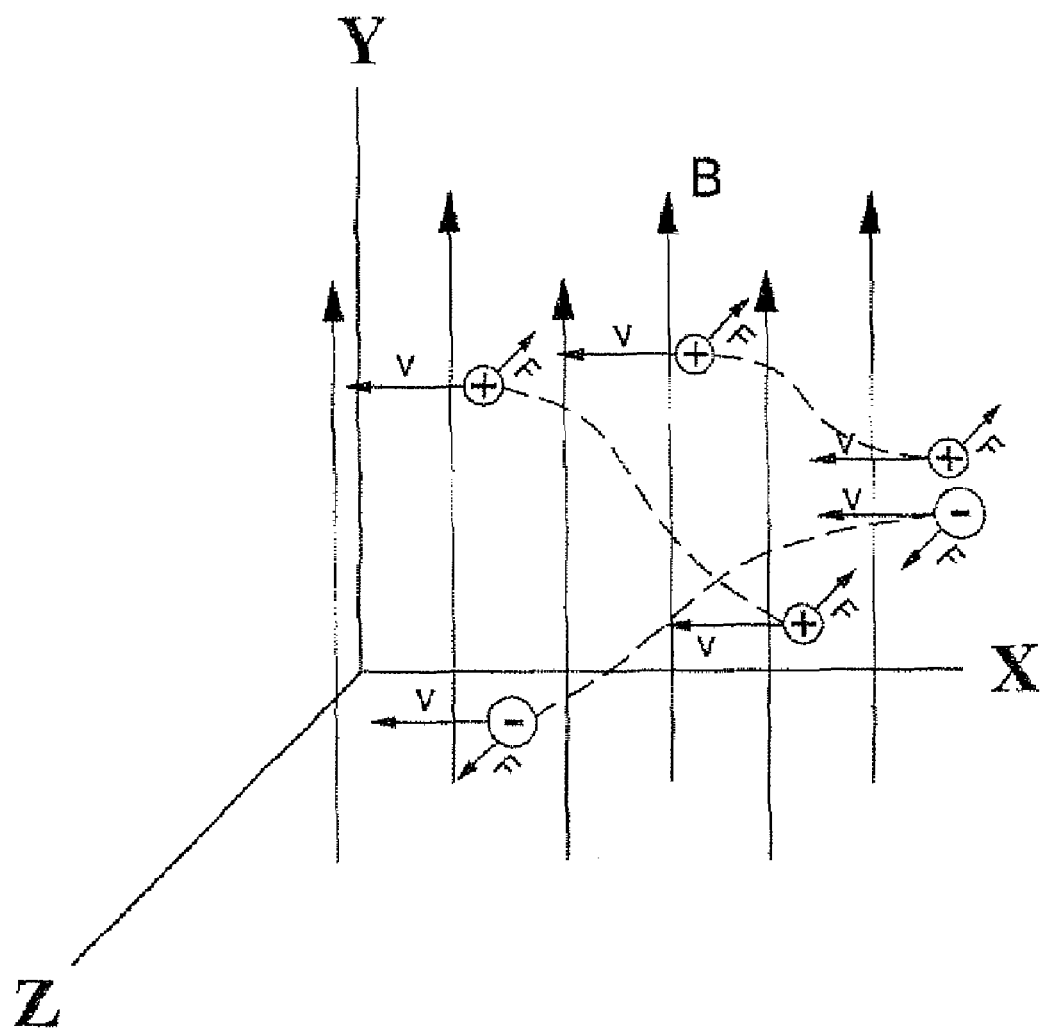

This invention relates to separating a mixture of oppositely charged ions. More particularly, this invention relates to separating oppositely charged ions using magnetic fields. Still more particularly, this invention relates to separating ions that form diatomic molecules such as hydrogen and oxygen from another compound, particularly water, using magnetic fields.

2. Prior Art

Prior art teaches the use of a parabolic dish to concentrate solar energy into a reaction chamber where water is injected and dissociated into its constituent parts due to the extreme temperatures achieved. This method achieves efficient dissociation of the water molecule into its ionic constituents. Prior art methods exist for the separation of ionic components from a gaseous stream, the majority of which involve the use of a membrane to separate the ions based on their physical size or other physical characteristics. Membranes have many drawbacks, the most significant being the cost of the materials involved and the high frequency of membrane fouling.

In the past, various methods and apparatuses for the separation of ions have been proposed to reduce this problem. One such solution is the "Method and Apparatus for Magnetic Separation of Ions" disclosed in U.S. Pat. No. 6,768,109 issued to Brokaw et al. (Brokaw) which is hereby incorporated by reference as if set forth herewith to describe a prior art method of ion separation. Brokaw discloses an apparatus that has a vessel that is divided by a flow director. The flow director is a wall that separates the vessel into two chambers. The flow director includes a discharge that can be an orifice, a Venturi, and the like. A fluid flows from one chamber to another chamber through the discharge that is proximate to the center of the flow director. This centers the flowing fluid in a magnetic field that is applied to the fluid. The magnetic field imparts a force on the ions causing the positive ions to migrate towards one outlet of the vessel and negative ions to migrate towards the second.

The flow of fluid is directed towards two outlets. The negative ions flow out of the first outlet and the positive ions flow out the second outlet for storage or use. There are several problems associated with using this configuration to separate ions. First, the cost of such a structure is prohibitive because of the material required and configuration of the two separate outlets. Furthermore, this process requires that a fluid include a large content of oppositely charged ions.

In the case of thermally dissociated ions, this process requires that a base substance such as water be heated sufficiently so that a large percentage of the molecules have dissociated into their constituent ions, otherwise the non-dissociated molecules will impede separation. Additionally, once sufficiently heated, the base substance must be kept at this high energy throughout the separation process.

SUMMARY

The above and other problems are solved and an advance in the art is made by an improved method and apparatus for the separation of ions in accordance with this invention. A first advantage of this process in accordance with this invention is that construction of a vessel is easy since there is only one outlet and one inlet. This reduces the cost of construction and increases the speed in assembling the device. Furthermore, the ions are only separated long enough to bond to other like ions requiring a smaller magnetic field. Thus, less energy is needed. Furthermore, in the case of thermally dissociated ions, the method and apparatus of this invention may be performed at lower temperatures than prior art systems. This further reduces costs and allows the process to be used in more systems.

In accordance with one embodiment of this invention, the apparatus for the separation of ions comprises a vessel having one inlet and one outlet. A flow director may divide the vessel into a first chamber and a second chamber. A nozzle may be disposed in the body between the inlet and the outlet. The nozzle is a small opening in the flow director and is configured to fluidly couple the chambers. The nozzle may be an orifice, a Venturi, and the like. Fluid flows into the vessel via the inlet into the first chamber. The fluid then flows through the nozzle into the second chamber.

In the second chamber, a magnetic field is applied to the fluid flowing through the second chamber. The magnetic field is orthogonal to the direction of the flow through the chamber. The magnetic field is also located in the second chamber between the flow director and the outlet.

The disclosed method is directed toward a method of separating ions. The method of separating ions comprises separating oppositely charged ions via a magnetic field applied to a substance that contains the ions. The method includes flowing the ions through a magnetic field perpendicular to the flows of the substance and separating ions based on ionic charge.

BRIEF DESCRIPTION OF THE DRAWING FIGURES

Figure 2:
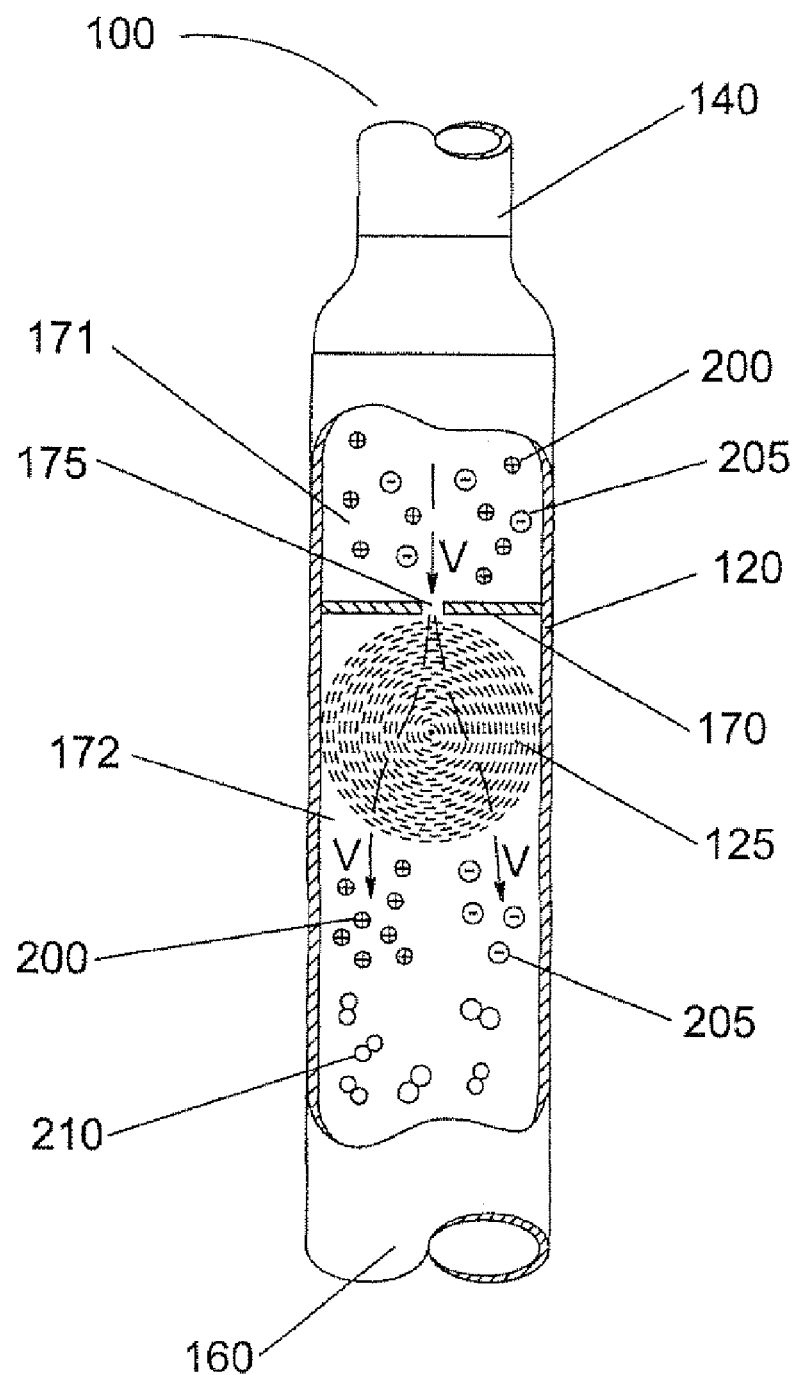
Figure 4:
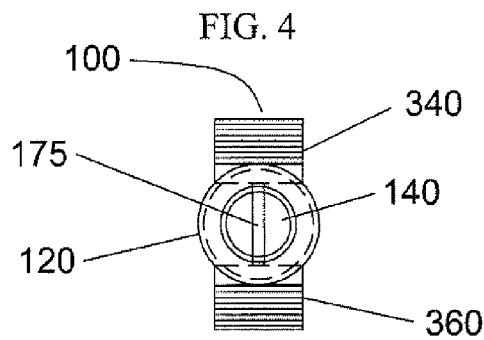
Figure 3:
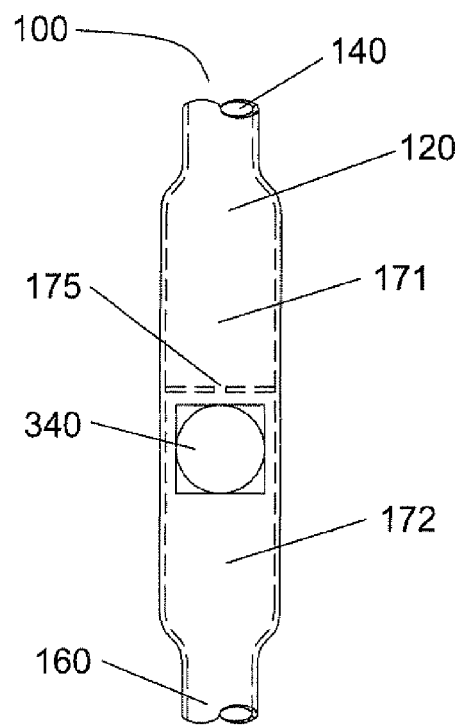
Figure 5:
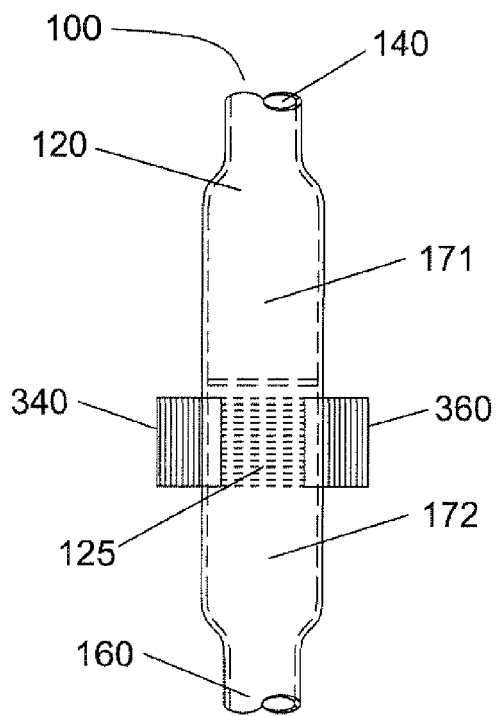

The above features and advantages of this invention are described in the following detailed description and are shown in the following drawings:

FIG. 1 illustrating a graphic schematic of the effects of a magnetic field on charged ions;

FIG. 2 illustrating a schematic of an exemplary embodiment of an ion separator;

FIG. 3 illustrating a front view of the exemplary embodiment of an ion separator;

FIG. 4 illustrating a top view of the exemplary embodiment of an ion separator; and FIG. 5 illustrating a side view of the exemplary embodiment of an ion separator.

DETAILED DESCRIPTION

Persons of ordinary skill in the art will realize that the following description of the present invention is illustrative only and not in any way limiting. Other embodiments of the invention will readily suggest themselves to such skilled persons having the benefit of this disclosure.

The apparatus and process separates any ions of opposing charge. The method for achieving this separation is based on the fundamentals of magnetism and the forces that are generated on charged particles moving through a magnetic field. The force that is imparted on the particle by the field is perpendicular to both the direction of travel and the direction of the magnetic field lines. As illustrated in FIG. 1, particles of opposite charge that encounter the same field moving in the same direction will incur forces opposite one another. This is shown by the force vector (F) imparted on a particle moving with velocity vector (v) in a magnetic field (B). As the moving particle encounters this new force the direction of travel will be changed. The formula for calculating the force generated on charged particles moving in a magnetic field is:

$$F=(qv)(B) \tag{1}$$

Where:

F is the generated force, q is the particle charge, v is the particle velocity and B is the magnitude of the magnetic field.

The equation formally shows that particles of opposite charge experience opposing forces, and that the force due to the magnetic field is proportional to the velocity of the particle and the magnitude of the magnetic field. Therefore, a particle moving at a high velocity in a relatively small magnetic field experiences a great enough force to change its direction.

FIG. 2 illustrates an exemplary apparatus for magnetic separation of ions, hereinafter referred to as ion separator 100. The ion separator 100 includes a vessel 120. Fluid containing dissociated ions flows through the vessel 120. The vessel 120 can be pipe shaped as in a preferred embodiment, as well as other shapes that provide both fluid flow and structural characteristics for fluids in accordance with this invention. Vessel 120 has one inlet 140 and one outlet 160. The inlet 140 is fluidly coupled to the outlet 160. Fluidly coupled means to allow for fluid flow and fluid communication.

In some embodiments, flow director 170 is a wall that separates vessel 120 into a first chamber 171 and second chamber 172. Nozzle 175 is an orifice, a Venturi, and any other type of opening through flow director 170 that allows fluid to flow though vessel 120 from first chamber 171 to second chamber 172.

In some embodiments, magnetic field 125, shown perpendicular to the drawing page, is established in the vessel 120 proximate to outlet 160. In the embodiments having two chambers, magnetic field 125 is in second chamber 172 proximate outlet 160. Magnetic field 125 is orthogonal to the direction of the flow, (V) of the fluid through vessel 120. When a fluid flows through vessel 120, magnetic field 125 passes through the fluid perpendicular to the direction of the fluid flow.

Oppositely charged ions 200 and 205 enter the vessel 120 through the inlet 140 and flow towards outlet 160. The oppositely charged ions 200 and 205 enter the magnetic field 125 where a force is imparted on the ions 200 and 205 in a direction perpendicular to the magnetic field lines of the magnetic field 125. In some embodiments, nozzle 175 focuses the stream of flowing fluid into the center of the magnetic field 125.

The direction of the force is a function of the charge of ions 200 and 205. The force causes the ions 200 and 205 to separate as the ions 200 and 205 flow toward outlet 160. The separated ions 200 and 205 then join together to form their stable diatomic molecules 210. Diatomic molecules 210 then pass through outlet 160. The diatomic molecules 210 and any unreacted fluid are then stored, consumed, or separated from one another using conventional methods.

Unlike prior art methods for separating ions, a large distance of separation is not needed. Thus, less energy needs to be applied to a substance upon entering the apparatus to separate the dissociated ions. Thus, this method and apparatus have advantages over prior art methods for separating ions.

In a preferred embodiment, ion separator 100 can separate dissociated hydrogen ions from the oxygen ions. This is due to the nature of the ions in dissociated water. The $H^+$ ions have no electron so they are positively charged. The $O^{2-}$ ions have two extra electrons, and therefore have a strong negative charge. The fact that the ions have opposing charges and will be moving in the same direction through the same magnetic field 125 provides the opposing forces necessary to achieve separation of the ions. Once a slight separation is achieved, the hydrogen ions combine into the stable $H_2$ molecule, and the oxygen ions combine into the stable $O_2$ molecule. It is these stable diatomic molecules that prevent the ions from recombining into water as they leave the single outlet as a mixture of product gases.

Referring now to FIGS. 3, 4, and 5 front, top and side views of an exemplary ion separator 100 are illustrated. The ion separator 100 includes at least one magnet 340 or a plurality of magnets (i.e., two magnets 340 and 360). It is contemplated that the magnets 340 and 360 can be substituted with electric coils or other magnetic field generators that generate the magnetic field 125 in vessel 120.

In some embodiments, inlet 140 includes a coupling for connecting to a pipeline delivering the fluid. The outlet 160 may also include a coupling for connecting to a pipe to deliver the fluid to a subsequent processing system. In these embodiments, ion separator 100 is connected to an in-line of a pipeline and is used to separate oppositely charged ions being transported through a pipeline.

In the preferred exemplary embodiment, a fluid in which the ions are suspended enters vessel 120 through inlet 140. The fluid enters first chamber 171. The fluid then passes through a nozzle 175 into second chamber 172. In second chamber 172, magnets 340 and 360 generate magnetic field 125. Magnetic field 125 is applied to the fluid to separate the ions. The separated ions combine to form diatomic molecules, and the diatomic molecules and any unreacted fluid then flow out of vessel 120 through outlet 160.

The method and apparatus are applicable to any process that requires the separation of ions with opposing electrical charges. The primary benefit to be derived is in the field of hydrogen production, where water is thermally dissociated into hydrogen and oxygen ions that are then separated and collected for use as fuel upon stabilization as $H_2$ and $O_2$ gas. There are many existing methods of heating water that could be employed, such as nuclear, or this process may be combined with industrial processes that generate waste heat. In a preferred embodiment the method and apparatus are used in conjunction with a solar heating source as a means of dissociating water into $H^+$ and $O^{2-}$ ions. The method and apparatus is a simpler, less expensive, and more efficient means of separating the dissociated ions. The method and apparatus are improvements on the prior art because they specify a more efficient separation method. Once separated, the hydrogen and oxygen ions are stabilized as $H_2$ and $O_2$ gas and can be collected for storage and/or consumption. Conventional separation techniques may be employed to separate the $H_2$ from the $O_2$ prior to storage.

Embodiments and applications of an ion separator in accordance with this invention are shown and described. It is expected that those skilled in the art can and will design alternative embodiments that infringe on this invention as set forth below either literally or through the Doctrine of Equivalents.

The invention claimed is:

1. An apparatus comprising:
   a vessel having an inlet for receiving a flow of fluid;
   a chamber communicating with the inlet;
   at least one magnet positioned to provide a magnetic field located at a divergence region of the chamber and oriented substantially orthogonally to a direction of the flow of the fluid through the chamber; and
   a merging region within the chamber and positioned at a location in the chamber along the direction of the flow of the fluid downstream from the divergence region wherein the chamber comprises a first portion communicating with the inlet, and a second portion including the divergence region and the merging region, the first portion of the chamber separated from the second portion of the chamber by an inter-chamber wall; and a nozzle disposed in the chamber wall communicating a flow path from the first portion of the chamber to the second portion of the chamber and directing the flow of fluid to the divergence region.

2. The apparatus of claim 1 wherein the nozzle centers the flow of fluid in the magnetic field.

3. The apparatus of claim 1 wherein the at least one magnet comprises a single magnet.

4. The apparatus of claim 1 wherein the at least one magnet comprises a plurality of magnets.

5. The apparatus of claim 1 wherein the at least one magnet comprises at least one electromagnet.

6. The apparatus of claim 1, further including a single outlet from the chamber positioned at a location along the direction of the flow of the fluid downstream from the merging region.

7. A method for recombining ionic species comprising:
   directing a confined flow of a source fluid mixture towards a divergence region, the source fluid mixture containing at least a first ionic species and a second ionic species, the first and second ionic species capable of both heterogeneous and homogeneous combination;
   applying within the divergence region a magnetic field in a direction orthogonal to the flow, the magnetic field having a flux sufficient to bias the first ionic species into a first flow stream and the second ionic species into a second flow stream independent from the first flow stream, the divergence region having a length sufficient to allow the first ionic species to combine homogeneously while in the first flow stream and to allow the second ionic species to combine homogeneously while in the second flow stream; and
   merging the first flow stream and the second flow stream together to form an output fluid mixture of homogeneously combined first ionic species and homogeneously combined second ionic species.

8. The method of claim 7 wherein directing the confined flow of a source fluid mixture towards the divergence region, the source fluid mixture containing at least a first ionic species and a second ionic species, the first and second ionic species capable of both heterogeneous and homogeneous combination comprises directing a source fluid mixture of hydrogen ions and oxygen ions.

9. The method of claim 8 further comprising:
   first dissociating water into a source fluid mixture of hydrogen ions and oxygen ions; and
   directing a flow of the source fluid mixture towards the divergence region.

10. The method of claim 9 wherein:
    directing the confined flow of the source fluid mixture towards the divergence region comprises directing the flow from an inlet into a chamber;
    applying within the divergence region a magnetic field in a direction orthogonal to the flow comprises applying the magnetic field within the chamber at a region downstream in the flow from the inlet; and
    merging the first flow stream and the second flow stream together comprises directing the first flow stream and the second flow stream together from the chamber through an outlet to form the output fluid mixture.

11. The method of claim 10 wherein directing from an inlet into a chamber a flow of a source fluid mixture containing at least a first ionic species and a second ionic species comprises directing a source fluid mixture of hydrogen ions and oxygen ions from the inlet into the chamber.

12. The method of claim 10 further comprising:
    first dissociating water into a source fluid mixture of hydrogen ions and oxygen ions; and
    directing a flow of the source fluid mixture towards the inlet.

\* \* \* \* \*